United States Patent [19]

Husslein et al.

[11] Patent Number: 4,798,938

[45] Date of Patent: Jan. 17, 1989

[54] TEMPERATURE CONTROL APPARATUS FOR A BAKING OVEN

[75] Inventors: Julius Husslein, Vachendorf; Günther Wittauer, Traunreut; Helmut Knoll, Hufschlag; Robert Dandl, Tacherting, all of Fed. Rep. of Germany

[73] Assignee: Bosch-Siemens Hausgeraete GmbH, Munich, Fed. Rep. of Germany

[21] Appl. No.: 131,338

[22] Filed: Dec. 9, 1987

Related U.S. Application Data

[63] Continuation of Ser. No. 770,693, Aug. 29, 1985, abandoned.

[30] Foreign Application Priority Data

Aug. 29, 1984 [DE] Fed. Rep. of Germany ....... 3431740

[51] Int. Cl.⁴ ........................... A21B 1/00; A21B 1/22

[52] U.S. Cl. .................................... 219/395; 219/412; 219/398

[58] Field of Search ................................ 219/393–398, 219/412–415, 513, 417, 419, 425, 441

[56] References Cited

U.S. PATENT DOCUMENTS

| | | | |
|---|---|---|---|
| 3,560,711 | 2/1971 | Manecke | 219/398 |
| 4,238,670 | 12/1980 | Maitenaz | 219/398 |
| 4,345,144 | 8/1982 | Bergquist | 219/398 |
| 4,420,072 | 12/1983 | Treffinger | 219/414 |
| 4,517,452 | 12/1983 | Krasznai et al. | 219/395 |
| 4,535,226 | 8/1985 | Logel et al. | 219/400 |

*Primary Examiner*—E. A. Goldberg
*Assistant Examiner*—Lincoln Donovan
*Attorney, Agent, or Firm*—Herbert L. Lerner; Laurence A. Greenberg

[57] ABSTRACT

A temperature control apparatus for a baking oven includes a baking heating element for heating the baking oven, a grill heating element disposed in the baking oven, a first thermostatic baking oven regulator manually settable to different temperatures for the baking heating element, a second regulator manually settable to different heating stages for the grill heating element, and a single setting device for setting and operating the first and second regulators, the setting device having a first control range in which the first regulator is adjustably controlled and a second control range in which the second regulator is adjustably controlled.

15 Claims, 4 Drawing Sheets

TEMPERATURE CONTROL APPARATUS FOR A BAKING OVEN

This application is a continuation of application Ser. No. 770,693, filed Aug. 29, 1985, now abandoned.

The invention relates to a temperature control apparatus for a baking oven, including a thermostatic baking oven regulator manually settable to different temperatures for heating the baking oven and another regulator being manually settable to different heating stages for a grill heating element disposed in the baking oven. The invention deals with the problem of providing a baking oven with heating elements such as for low and high heat for roasting and baking, as well as a grill heating element for grilling in the oven, wherein different operating temperatures can also be selected manually for the grilling operation. This capability exists in a conventional baking oven, wherein a thermostatic baking oven regulator is provided for the heating element of the baking oven and a so-called energy regulator is provided for the grill heating element, which can be operated in different cyclic output stages or power surges. For example, an energy regulator of this type is disclosed in German Patent DE-PS No. 30 12 175. A setting device in the form of a setting shaft is provided for each of these regulators, through which the different temperatures or output stages or power steps can be set manually The installation of the second or other setting device in the control panel of the oven creates difficulties, due to the relatively small space available in the control panel. This is especially true in baking ovens of narrow construction, such as those having a width of 50 cm, as well as in baking ovens with the above-mentioned capabilities, wherein numerous service and indicating devices are already located in the control panel. In another prior art baking oven disclosed in German Published, Non-Prosecuted Application DE-AS No. 11 15 378, heating elements are provided for high and low heat and a grill heating element is also provided, which can also be utilized to provide high heat for baking. In this case, a thermostat is also included in the circuit of the grill heating element, which serves as a protective switch against excessive temperature and cuts off the current supply if an impermissibly high temperature is reached. However, this single thermostat or regulator which also controls the other heating elements is not suitable due to the long switching amplitudes required.

It is accordingly an object of the invention to provide a temperature control apparatus for a baking oven, which overcomes the hereinafore-mentioned disadvantages of the heretofore-known devices of this general type, which has a simple construction and which permits variable settings in different temperature ranges of the baking oven heater as well as of the grill heating element, while saving space.

With the foregoing and other objects in view there is provided, in accordance with the invention, a temperature control apparatus for a baking oven, comprising a baking heating element for heating the baking oven, a grill heating element disposed in the baking oven, a first thermostatic baking oven regulator manually settable to different temperatures for the baking heating element or body, a second regulator manually settable to different heating stages or temperatures for the grill heating element or body, and a single setting device for setting and operating the first and second regulators, the setting device having a first control range in which the first regulator is adjustably controlled and a second or additional control range in which the second regulator is adjustably controlled or influenced.

Due to the construction of the invention, an additional setting device for the grill heating element is not required, although the baking oven heating element (for high and low heat) as well as the grill heating element, each have their own regulator, which is preferably an energy regulator that can be set for different cyclic output stages or power steps, in the case of the grill heater. Thus, no more space is required in the control panel than is needed in a baking oven or a temperature control device in which only the baking oven :an be adjusted for different operating temperatures. In accordance with another feature of the invention, there is provided a switching device connected to the setting device for exclusively turning on the baking heating element or elements, such as for high and low heat, in the first control range and for exclusively turning on the grill heating element in the second or additional control range.

Within the scope of the invention, an embodiment can also be visualized with two thermostatic regulators, whereby the grill heating element can also be controlled and regulated in dependence on the operating temperature.

In accordance with a further feature of the invention, the grill heating element, its regulating device and the second regulator have a control circuit, at least in the second or additional control range the baking oven regulator is connected in the control circuit of the grill heating element, and the second baking oven regulator is set to a fixed maximum cut-off temperature in the second control range for temperature safety regulation during operation of the grill heating element. This permits the possibility of utilizing the baking oven regulator for two functions, i.e. the normal regulating function for the baking and roasting operation (first control range) and the temperature safety regulator function during the grilling operation (second control range). This is especially practical because there is normally at least a partially higher temperature in the oven for grilling than during baking or roasting, so that by changing the setting device into the second control range, the normal temperature region for baking and roasting is exceeded up to the point of reaching the predetermined cut-off temperature and if this cut-off temperature is not reached, the above-mentioned baking oven regulator has no control function, i.e. it remains in the closed position.

In accordance with an added feature of the invention, the second regulator is an energy regulator settable to different cyclic output or power stages.

In accordance with an additional feature of the invention, the baking oven regulator has a control shaft, the setting device is a setting shaft being rotatable to different angular positions and being non-rotatably connected to the control shaft, and including operating elements in the form of control and switching cams connected to the setting shaft for the switching device and the energy regulator.

In accordance with again another feature of the invention, the setting shaft has a remote control end connected to the control shaft, the switching device includes a plurality of switching contacts, and the control and switching cams on the setting shaft include at least one cam for setting the different cyclic output stages of the energy regulator and a plurality of cams for switching the switching contacts of the switching device.

In accordance with again a further feature of the invention, there is provided circuitry for the switching contacts, the switching device being a structural unit fastened to the baking oven regulator; and the setting shaft, switching contacts and circuitry being component parts of the structural unit.

In accordance with again an added feature of the invention, the second regulator is an energy regulator having a regulating contact, the setting device is a setting shaft having control cams disposed thereon, and including a switching device including a first common current branch containing the baking oven regulator, a second current branch connected to the first current branch and containing the baking heating element or a part thereof, a third current branch parallel to the second current branch containing the grill heating elements and the regulating contact of the second regulator, and respective switching contacts contained in the current branches, the current branches being interrupted and connected through the switching contacts by the control cams for changing between the first and the second control ranges.

In accordance with again an additional feature of the invention, the switching device includes a fourth current branch parallel to the third current branch, containing a control heater for the energy regulator and an additional switching contact operated by the setting shaft.

In accordance with yet another feature of the invention, the energy regulator is settable to different cyclic output or power stages or steps, and the additional switching contact is set to an open position in the highest output stage of the second control range. Due to this preferred embodiment, in the highest power step or output stage of the second control range (grilling region), the bi-metal heater of the energy regulator is separated from the current supply, such as mechanically with a control cam of the setting shaft. In this way, the grill heating element is constantly operated for 100% of the "on" time, without any load on the bi-metal heater.

In accordance with yet a further feature of the invention, the setting shaft includes an angular rotation range of 0° to substantially 250° corresponding to the first control range, an angular rotation range of substantially 260° to 315° corresponding to the second control range, and a detent position between the ranges. In accordance with a concomitant feature of the invention, the setting shaft has at least one detent position in the second or additional control range for the energy regulator. Other features which are considered as characteristic for the invention are set forth in the appended claims. Although the invention is illustrated and described herein as embodied in a temperature control apparatus for a baking oven, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
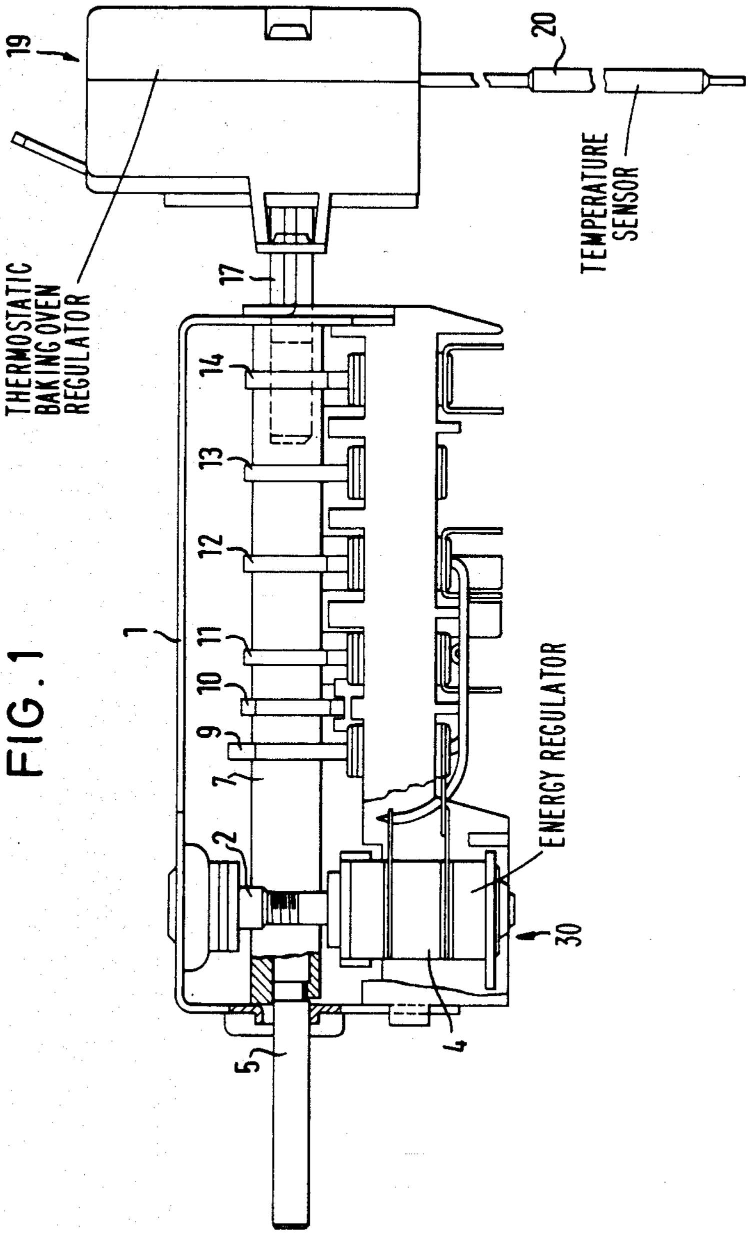
FIGS. 1 and 2 are respective fragmentary, side-elevational and top plan views of the temperature control apparatus according to the invention.
Figure 2:
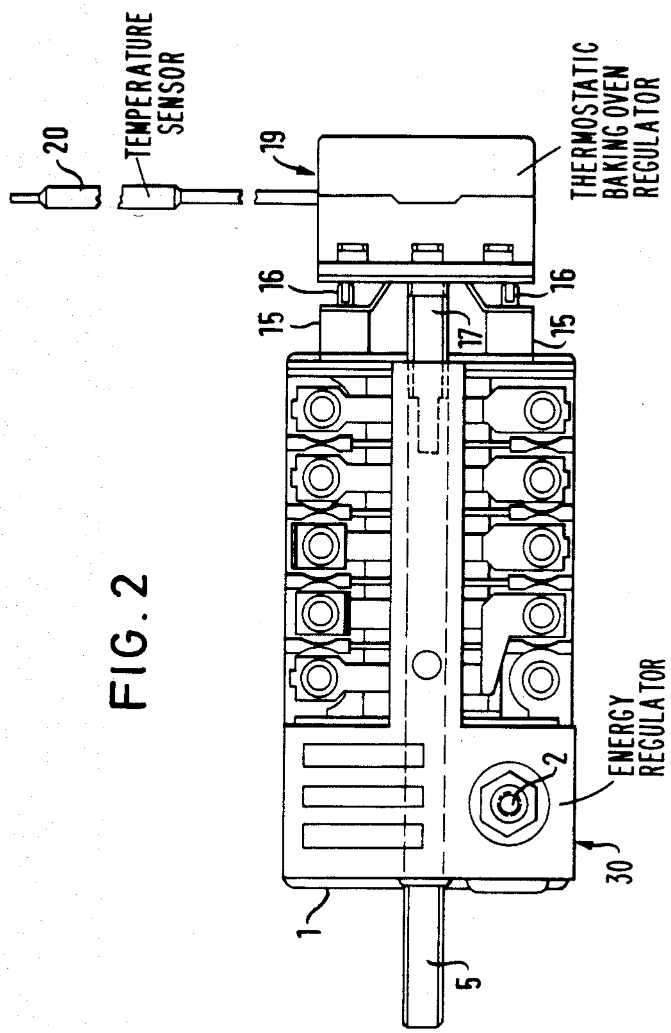
Figure 4:
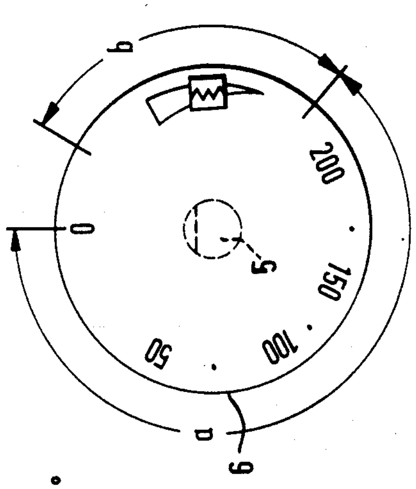
FIG. 4 is a front-elevational view of a setting and control element of the temperature control apparatus.

Referring now to the figures of the drawings in detail and first, particularly, to FIGS. 1 and 2, there is seen an embodiment including a housing or carrier 1 of a switching device to which an energy regulator 3 is fastened by means of an adjusting screw 2. The height of the energy regulator 3 can be adjusted by turning this adjustment screw. The energy regulator 3 supported by the screw 2 comprises a block 4, which is attached to an operating or switching bi-metal that may be formed of an elongated bi-metal spring, which is clamped at one side and surrounded by a non-illustrated bi-metallic heater. Such an energy regulator is disclosed in German Patent DE-PS No.30 12 175. An essential part of this energy regulator is a setting shaft 5, which has a flat at the end thereof that extends beyond the housing 1, and onto which a rotatable knob 6 can be mounted and securely connected, as shown in FIG. 4. As is also disclosed in German Patent DE-PS 30 12 175, the setting shaft 5 is provided with a control cam in the region of the energy regulator 30, which works in conjunction with the above-mentioned bi-metal switch. Inside the U-shaped yoke-like housing 1, the setting shaft 5 is fixedly connected with a sleeve-shaped cam carrier 7, which carries the control cam for the energy regulator 30 and is also provided with control cams 9 to 14 which are constructed in the form of curved discs. The control cams 9 to 14 act in conjunction with the switching contacts of a switching device, which will be described below. A baking oven regulator 19 is mounted at the end of the yoke-shaped housing 1, which is opposite the free end of the setting shaft 5. Two mounting pads 15 are provided on the housing 1, onto which the thermostatic baking oven regulator 19 can be mounted and securely fastened. The baking oven regulator 19 also has a control shaft 17, which projects into a matching recess in the setting shaft 5 and in the cam carrier 7 and is fixedly connected with these components, so that a rotation of the setting shaft is directly transferred to the control shaft 17 of the baking oven regulator 19. As already mentioned, the oven regulator 19 is a thermostat with a bi-metal element. The regulator 19 is set or adjusted by the control shaft 17 and has a temperature sensor 20 with a free end which extends into the baking space of the oven and responds to the actual temperature therein. For example, a conventional set of spring-action contacts may be used in conjunction with the above mentioned adjustable bi-metal, through which the baking oven heating unit (which may be formed of heating elements for low and high heat) can be switched on and off, depending on the temperature to which the control shaft 17 is set. The control shaft 17 changes the distance between the bi-metal and the spring action contacts. As shown in FIGS. 1 and 2, the regulators 30, 19, the control shaft formed of the two parts 5 and 17, and the switching device which will be explained below, are parts of an integral, marketable structural module, wherein only a single setting shaft 5 is provided for setting both regulators. This module can be installed behind the control panel of the oven of a range, for example, and is connected with the respective heating element of the baking oven by electrical lines described below.

As shown in particular in FIG. 4, the setting shaft 5 can be rotated within a first setting or control range a with a rotation or angular range of 0° to about 250°, and the shaft 5 can be further rotated in a second setting or control range b with a rotation or angular range of about 260° to 315°. In the first control range a, the oven regulator 19 is operated, i.e. it is simultaneously turned on and off and set to the desired temperatures such as from 20° C. to 250° C. Turning the oven on and off is carried out by switching high and low heating elements. A grill heating element can be provided for the high heat in such a way that in the second control range b only one grill heating element is switched on, which is controlled or regulated by the energy regulator 30. In this control range, the on-off timing ratio of the grill heating element can be variably set by the energy regulator 30, up to a switched on duration of 100% in an angular position of 316°. This means that in the first control range a, only the oven heater is turned on and the grill heating element is turned off, unless the grill heater is made part of the oven heating apparatus through the use of a series connection or in some other way. In the second control range b, only the grill heating element is used and the baking oven heater is turned off.

Figure 5:
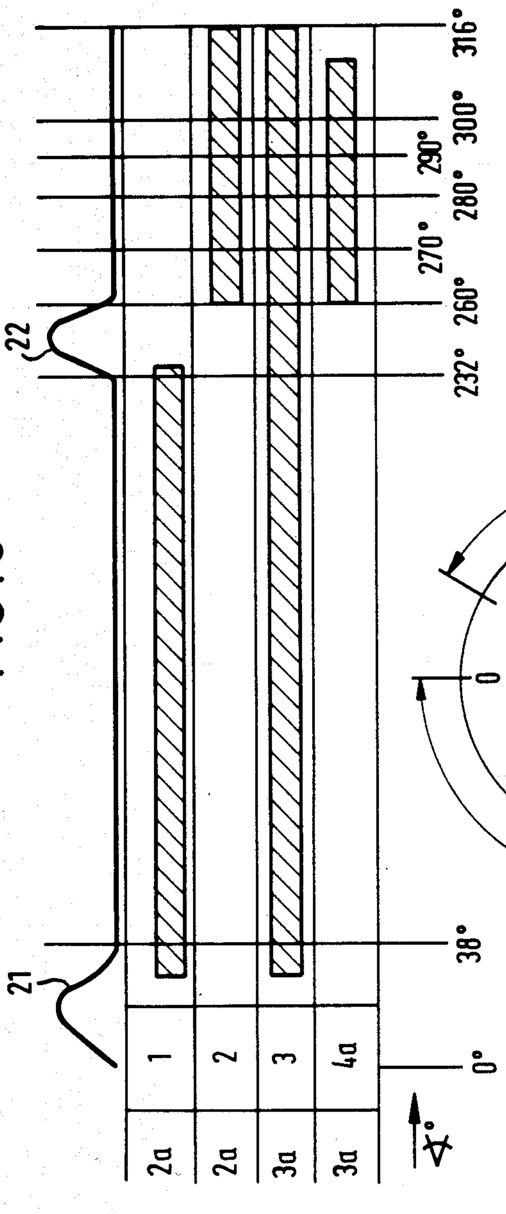
FIG. 5 is a function diagram for clarification of the functional modes of the various switching contacts of the temperature control apparatus.

In the diagram according to FIG. 5, the respective on and off switching action is indicated by respective curves 21 and 22. In order to,. ensure that in the first control range a the energy regulator 30 or its switching contact is not turned on, i.e. remains open, the corresponding control cam in the region of the energy regulator 30 is shaped in such a way that in the angular region of the first control range a, the cam is concentric to the shaft. The cam only has a shape deviating therefrom at the beginning of the second control range b, so that the switching contact of the energy regulator 30 is closed and the associated grill heating element is turned on. Conversely, in the second control range b only the energy regulator 30 is to be adjusted with respect to the different cyclic power or output stages, but not the baking oven regulator 19. At the end of the first control range a, the baking oven regulator 19 is set at its highest adjustment position. As the setting shaft 5 is further rotated into the second control range b, the baking oven regulator 19 is set to a cut-off temperature, corresponding to the angular position of the adjustment knob, for example at 300° C and in this position the distance between the bi-metal and the snap spring contact, for example, is so great that during normal operation of the baking oven and the grill heating element together, this cut-off temperature is never reached. Thus, in the second control range b the oven regulator 19 serves as a temperature safety regulator with a cut-off temperature which is chosen in such a way, that if this temperature is reached in the interior of the oven due to some malfunction, all of the heating elements are turned off and this cut-off or safety temperature cannot be exceeded under any circumstances.

Figure 3:
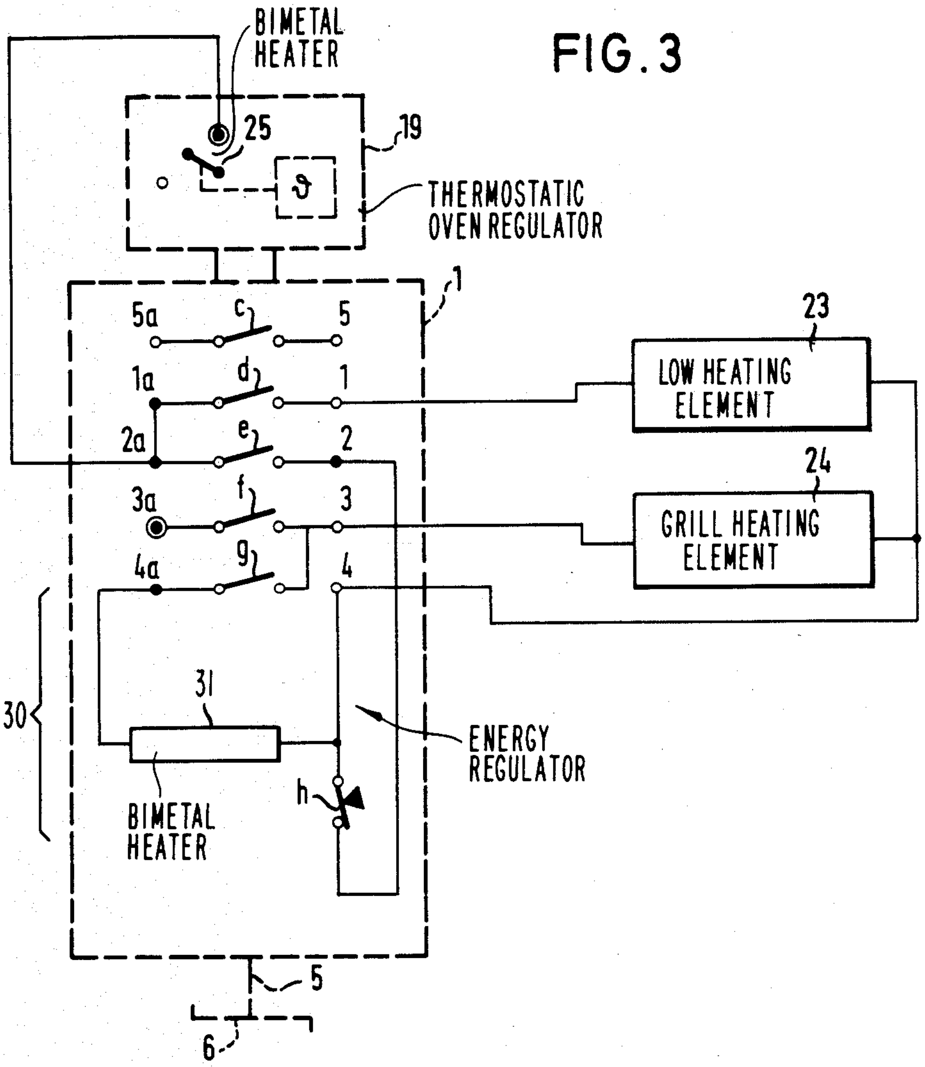
FIG. 3 is a schematic and block circuit diagram of the temperature control apparatus.

In FIGS. 3 and 5 the construction and function of the switching device for the two regulators 30 and 19 and for the corresponding heating elements, is illustrated. In FIG. 3, the low heating element in the form of a heating element outside of the oven interior is designated with reference numeral 23, and the grill heating element is designated with reference numeral 24; this heating element can be separately operated in the pure grilling operation and in the normal baking or roasting mode, i.e. in the control range a, it can be operated in series with the low heating element 23, thus providing the high heat for baking. The baking oven regulator 19, the housing 1 with the energy regulator 30, the setting shaft 5 and the rotatable knob 6 are indicated by broken lines. The oven regulator 19 is provided with a switching contact 25, the operation of which is dependent on a thermostatic device which can be set for different temperatures, as mentioned above. An input terminal **2*a* of the switching circuit, which will be described below, is connected in series with the switching contact 25 of the oven regulator 19. The center conductor of the power supply network is connected to a terminal 3*a*. The switching device includes five switching contacts, so that the switching contact c, for instance, can be assigned to a signal generating device, which is operated by the control cam 9 of the setting shaft 5, for example. The remaining control cams 10 to 13 of the setting shaft 5 are assigned to the remaining switching contacts d, e, f and g. By closing the contacts d and f and opening the contacts e and g, connections are established between the points 1*a* and 1 and between the points 3*a* and 3 of the first control range a, according to the diagram shown in FIG. 5, and the oven regulator 19 is connected to the high and low heat elements 23 and 24, which are operated in series. The oven regulator 19 precedes this series circuit. In this way, the regulating contact h of the energy regulator 30 is open and so is the switching contact g for the bi-metal heater 31 of the energy regulator 30**; this can be achieved by a corresponding construction and shape of the respective control cams.

In this way, the bi-metal heater 31 is not operated, i.e. the circuit branch **3*a* - 4*a* is open, as seen in the diagram. In this position the baking oven heating elements 23 and 24 can be set to different temperature values in the control range a. Further rotation of the setting shaft 5 beyind a detent indicating the position of the shaft 5 in the region of the curve 22 and into the control range b, sets the baking oven regulator 19 to a higher cut-off temperature, which corresponds to the rotational angle, the switching contact d in the switching region 1*a*-1 is opened, and the switching contacts e and g are closed, so that the low heating element 23 is taken out of the circuit. The grill heating element 24 is therefore connected directly between the input terminal 2*a* and center terminal 3*a* and in series with the oven regulator 19, which now serves as a temperature safety limiter. The previously-mentioned control cam of the setting shaft 5 can therefore set the energy regulator 30 to different cyclic power or output stages, so that the bi-metal heater 25 operates in the conventional way with the bi-metal opening and closing the regulating contact h, and works in conjunction with the regulator 30. In this manner, the grill heating element 24 is operated in a time cycle. In the highest angular position of the rotatable knob 6, for example, the switching contact g is opened, and the bi-metal or control heater 31′ is separated from the current circuit, so that the grill heating element 24 is turned on 100% of the time, i.e. the switching contact h is closed all the time. In FIG. 5**, the above-described positions of the switching contacts, designated by the conenction points of their current branches, are indicated by cross-hatching columns (representing the closed position of the switching contacts)

and by the absence of cross hatching (open position of the switching contacts).

The foregoing is a description corresponding in substance to German application No. P 34 31 740.6, filed Aug. 29, 1985, the International priority of which is being claimed for the instant application, and which is hereby made part of this applcation. Any material discrepancies between the foregoing specification and the aforementtioned corresponding German application are to be resolved in favor of the latter.

We claim:

1. Temperature control apparatus for a oven having a baking heating element for heating the baking oven, said temperature control apparatus comprising a grill heating element disposed in the baking oven, a first thermostatic baking oven regulator manually settable to different temperatures for regulating said baking heating element, a second regulator manually settable to different heating stages for regulating said grill heating element, and a single setting device for setting and operating said first and second regulators, said setting device having a first control range in which said first regulator is adjustably controlled and a second control range in which said second regulator is adjustably controlled, said first and second control range being mutually exclusive, and said first and second regulators each being continuously variable within each range, and controlled mutually exclusively.

2. Temperature control apparatus according to claim 1, including a switching device connected to said setting device for exclusively turning on said baking heating element, in said first control range and for exclusively turning on said grill heating element in said second control range.

3. Temperature control apparatus according to claim 1, wherein said baking heating element includes high and low temperature heaters.

4. Temperature control apparatus according to claim 1, wherein said grill heating element and said second regulator have a control circuit, at least in said second control range said baking oven regulator is connected in said control circuit of said grill heating element, and said second baking oven regulator is set to a fixed maximum cut-off temperature in said second control range for temperature safety regulation during operation of said grill heating element.

5. Temperature control apparatus according to claim 4, wherein said second regulator has a regulating contact in said control circuit thereof.

6. Temperature control apparatus according to claim 2, wherein said second regulator is an energy regulator settable to different cyclic output stages.

7. Temperature control apparatus according to claim 6, wherein said baking oven regulator has a control shaft, said setting device is a setting shaft being rotatable to different angular positions and being non-rotatably connected to said control shaft, and including operating elements in the form of control and switching cams connected to said setting shaft for said switching device and said energy regulator.

8. Temperature control apparatus according to claim 7, wherein said setting shaft has a remote control end connected to said control shaft, said switching device includes a plurality of switching contacts, and said control and switching cams on said setting shaft include at least one cam for setting said different cyclic output stages of said energy regulator and a plurality of cams for switching said switching contacts of said switching device.

9. Temperature control apparatus according to claim 8, including circuitry for said switching contacts, said switching device being a structural unit fastened to said baking oven regulator; and said setting shaft, switching contacts and circuitry being component parts of said structural unit.

10. Temperature control apparatus according to claim 1, wherein said second regulator is an energy regulator having a regulating contact, said setting device is a setting shaft having control cams disposed thereon, and including a switching device including a first common current branch containing said baking oven regulator, a second current branch connected to said first current branch and containing said baking heating element, a third current branch parallel to said second current branch containing said grill heating element and said regulating contact of said second regulator, and respective switching contacts contained in said current branches, said current branches being interrupted and connected through said switching contacts by said control cams for changing between said first and said second control ranges.

11. Temperature control apparatus according to claim 10, wherein said switching device includes a fourth current branch parallel to said third current branch, containing a control heater for said energy regulator and an additional switching contact operated by said setting shaft.

12. Temperature control apparatus according to claim 11, wherein said energy regulator is settable to different cyclic output stages, and said additional switching contact is set to an open position in the highest output stage of said second control range.

13. Temperature control apparatus according to claim 7, wherein said setting shaft includes an angular rotation range of 0° to substantially 250° corresponding to said first control range, an angular rotation range of substantially 260° to 315° corresponding to said second control range, and a detent position between said ranges.

14. Temperature control apparatus according to claim 7, wherein said setting shaft has at least one detent position in said second control range for said energy regulator.

15. Temperature control apparatus according to claim 1, wherein said second regulator is an energy regulator.

* * * * *